United States Patent [19]

Kodera et al.

[11] Patent Number: 4,918,683
[45] Date of Patent: Apr. 17, 1990

[54] OPTICAL INFORMATION MEDIUM HAVING A BASE PLATE MADE OF POLYMETHYLMETHACRYLATE WHICH IS A COPOLYMER OF METHYL METHACRYLATE AND METHYL ACRYLATE

[75] Inventors: Yoshie Kodera, Yokohama; Hisashi Kabe, Kamakura; Tetsu Ohishi, Hiratsuka; Jun Matsumoto, Odahara, all of Japan

[73] Assignee: Hitachi, Ltd., Tokyo, Japan

[21] Appl. No.: 178,267

[22] Filed: Apr. 6, 1988

Related U.S. Application Data

[63] Continuation-in-part of Ser. No. 104,983, Oct. 6, 1987, abandoned.

[30] Foreign Application Priority Data

Oct. 6, 1986 [JP] Japan .................................. 61-236123

[51] Int. Cl.⁴ .............................................. G11B 7/24
[52] U.S. Cl. .................................. 369/275; 369/288; 430/945; 430/270

[58] Field of Search ................ 369/275, 284, 288, 286; 346/135.1, 762; 430/945, 495, 270; 428/64, 65; 264/106, 107, 2.6, 2.7

[56] References Cited

U.S. PATENT DOCUMENTS

| | | | |
|---|---|---|---|
| 4,397,805 | 8/1983 | Holmes | 264/107 |
| 4,405,671 | 9/1983 | Ozawa et al. | 369/275 |
| 4,650,742 | 3/1987 | Goto et al. | 430/495 |

FOREIGN PATENT DOCUMENTS 59-198545 11/1984 Japan.
62-07709 1/1987 Japan.

Primary Examiner—Steven L. Stephan
Assistant Examiner—Hoa Nguyen
Attorney, Agent, or Firm—Antonelli, Terry & Wands

[57] ABSTRACT

An optical disc consists of a base plate, a reflective thin layer and a protective thin layer. As the base plate, polymethylmethacrylate is used. Since defects in the protective thin layer are a function of defects in the base plate, in order to reduce defects in the protective thin layer, defects in the base plate are reduced. For reducing defects in the base plate, a copolymer of methyl methacrylate and methyl acrylate is used.

16 Claims, 2 Drawing Sheets

OPTICAL INFORMATION MEDIUM HAVING A BASE PLATE MADE OF POLYMETHYLMETHACRYLATE WHICH IS A COPOLYMER OF METHYL METHACRYLATE AND METHYL ACRYLATE

BACKGROUND OF THE INVENTION

This application is a continuation-in-part of Ser. No. 104,983, filed Oct. 6, 1987, now abandoned.

The present invention relates to an optical information medium which is capable of recording/reproducing information optically, especially to an optical disc having a base plate with high durability.

As an information medium of high density and large capacity, an optical disc recording and reproducing information by a focused laser beam is well known. An optical disc only for reproduction consists of a base plate of a light transparent plastic material, a reflective thin layer having a high reflectance, for example, aluminum, which is sputtered on the base plate, and a protective layer formed on the reflective layer. As a recordable optical disc, a chalcogenide thin layer varying an optical coefficient by laser beam irradiation is used for a recording layer between a base plate and a protective layer.

So far, as a plastic material being used in a base plate of an optical disc, a copolymerization product of methyl methacrylate and ethyl acrylate, i.e., so-called polymethylmethacrylate (PMMA), is used for the consideration of transparency, fluidity at the time of injection molding and double refraction (birefringence) which causes laser noise. A video disc member made of a specially prepared PMMA is also disclosed in U.S. Pat. No. 4,397,805 to Holmes.

Furthermore, microscopic defects in the reflective thin layer or the recording thin layer cause drop-outs of the information at the time of the information recording or reproducing, and cause low quality.

For decreasing the microscopic defects, each process of the injection molding for replica manufacturing, the thin layer forming by sputtering and the protective layer sputtering has been done in a clean room.

However, a former method for decreasing the defects has been accomplished only at the time of manufacturing the optical disc, and no consideration has been given to generation of the defects of the disc during keeping of the disc.

SUMMARY OF THE INVENTION

An object of the present invention is to provide an optical disc which can be kept for a long time without generation of defects.

The inventors found that the defects in the thin layer were generated during keeping of the disc based on defects in the base plate.

In accordance with the present invention, the defects in the plastic base plate, i.e., the so-called replica, are decreased by decreasing an acrylate monomer included in the replica which supports the reflective thin layer or the recording thin layer.

For producing a PMMA resin for the optical disc, continuous bulk polymerization is adopted for decreasing the disproportionate reaction and for reducing the terminal double bond. Furthermore, the copolymer of ethyl acrylate and methyl methacrylate improves the stop characteristic for thermal degradation.

BRIEF DESCRIPTION OF THE DRAWINGS

Reference is now made to the drawings, wherein.

DETAILED DESCRIPTION OF THE PREFERRED EMBODIMENTS

The PMMA resin which is widely used as the replica of an optical disc is known to undergo a monomer degradation from the polymer tail mainly as a characteristic of a degradation mechanism. The degradation rate is determined by a elating temperature of the PMMA at the time of manufacturing the replica; an MMA monomer is dissoluted and fixed in a PMMA matrix in the replica by manufacturing pressure at the time of injection molding. A temperature of a thermal transformation of the PMMA decreases based on a moisture absorption quantity of the air, and the moisture content acts as a plasticizer. As a result of this action, the MMA monomer dissoluted in the PMMA matrix coheres in a looseness of the matrix, and a microscopic bladder generates with a pressure corresponding to an injection pressure. This phenomenon can be confirmed by leaving a replica in a hard atmosphere of 60° C. and 95% RH (relative humidity), and by obtaining variation of internal bladder defects. The replica is manufactured under the conditions of a melting temperature of 280° C. and an injection pressure of 400 Kg/cm$^2$.

Figure 2:
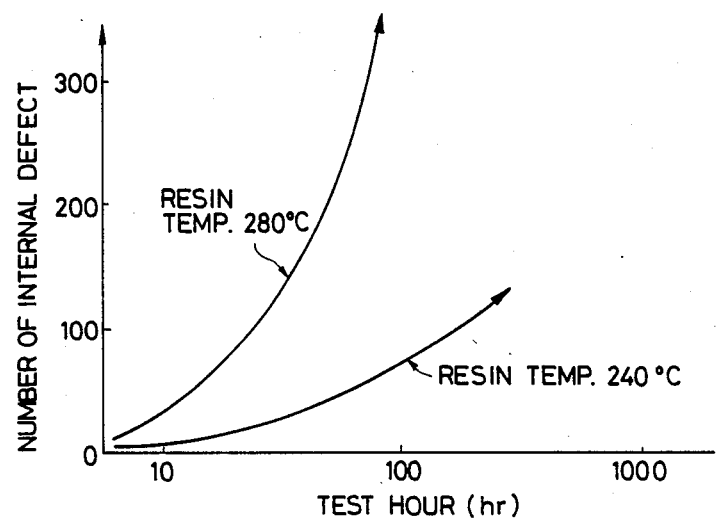
FIG. 2 illustrates a diagram indicating a change with a passage of time of internal defects in accordance with a prior optical disc.

The variation of the internal bladder of the replica which is manufactured under the conditions of a melting temperature of the PMMA of 240° C. and an injection pressure of 300 Kg/cm$^2$ decreases to one-third compared with the replica manufactured with the above-described conditions. FIG. 2 shows the variation of the number of bladder defects generated in the replica manufactured by a prior PMMA which is counted in a direction of a depth within a field of vision of a diameter of 2 mm by a differential interference microscope.

Figure 3:
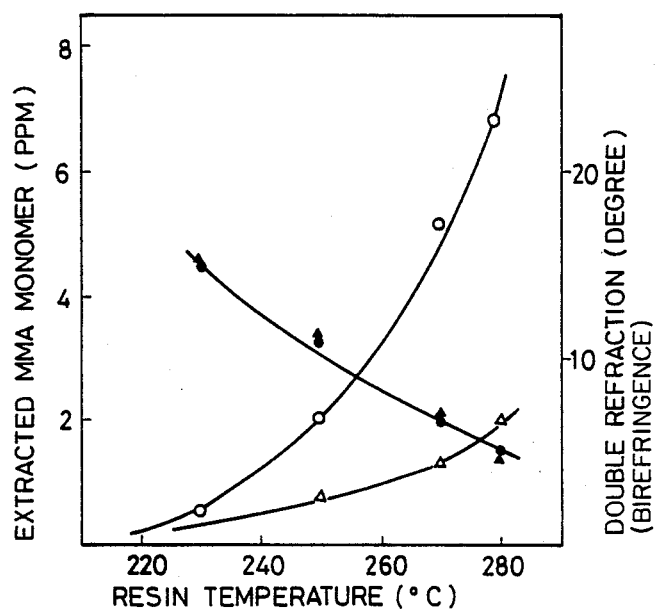
FIG. 3 illustrates a diagram indicating an extracted MMA monomer and a birefringence to resin temperature at the time of manufacturing a replica.

In FIG. 3, the symbol ○ depicts the quantity of a MMA monomer extracted in water under the condition of manufacturing replicas at each =1ting or injection temperature and immersed in water at a temperature of 60° C. for seven days from a PMMA copolymer of ethyl methacrylate and ethyl acrylate.

These results are obtained by gas chromatography. FIG. 3 shows that quantity of extracted MMA monomer increases with a increase in injection temperature.

A lower injection temperature is better for decreasing internal defects, but is worse insofar as laser noise is concerned because the double refraction (birefringence) increases over 10degrees as shown by the symbol ● in FIG. 3 which designates the birefringence of a PMMA copolymer of ethyl methacrylate and thyl acrylate as a function of resin temperature.

Increasing the internal bladder in the replica nearly coincides with an increase of the MMA monomer. Therefore, a long-term stability of a characteristic of the optical disc can be secured by improving not only a manufacturing condition of the replica, but also a heat resistance degradation of the replica material.

The inventors focused on the heat resistance degradation of the replica material, and investigated how to decrease the degradation speed of the monomer from the tail of the polymer in the PMMA.

As a termination reaction at the time of polymerization, a recombination reaction and a disproportionation reaction which produces a terminal double bond can be mentioned. Since the terminal double bond is a starting point of a polymer heat degradation, a decrease of the monomer degradative speed becomes possible by reducing a ratio of the polymerization termination by the disproportionation reaction. For reducing the disproportionation reaction, continuous bulk polymerization is adopted. A termination characteristic for thermal degradation can be improved by adopting a copolymer of ethyl methacrylate and methyl acrylate which has a large characteristic of holding a radical produced at the time of the thermal degradation, compared with that of ethyl acrylate.

The results of the termination characteristic for thermal degradation is shown in FIG. 3 by triangle marks. The quantity of extracted MMA monomer from a PMMA copolymer of methyl methacrylate and methyl acrylate becomes less than 2 ppm after immersing in water at a temperature of 60° C. for seven days, as shown by the symbol △ in FIG. 3, and the internal bladder defect in the replica was not observed after leaving it in an atmosphere of 60° C. and 95% RH. The birefringence of such a PMMA copolymer is shown by the symbol ▲ in FIG. 3.

As a measuring method for the extracted monomer in the replica, a method for analyzing a sample dissolved in acetone by gas chromatography can also be used instead of the hot water extracting method. In this method, a methyl isobutyl ketone is used as an internal standard.

For producing a PMMA resin of which the optical disc is made, continuous bulk polymerization is adopted for decreasing the disproportionation reaction and for reducing the terminal double bond. Furthermore, the copolymer of methyl acrylate (MA) and methyl methacrylate (MMA) improves the stop characteristic for thermal degradation. MMA has the high glassy-transition temperature, but a low bond energy. Ethyl acrylate (EA) and MA have higher bond energies than MMA. If MMA in the copolymer is degraded thermally because of its low bond energy, EA or MA in the copolymer acts as a barrier for the thermal degradation because of its higher bond energy. Therefore, the termination characteristic for thermal degradation can be improved.

Since MA has a higher bond energy compared with EA, the use of MA in place of EA effects an even greater improvement. Increasing the amount of MA in forming the PMMA copolymer improves the termination characteristic, but lowers the heat resistance based on the glassy-transition temperature.

Thus, the relative proportion of MMA and MA is selected based upon the thermal degradation characteristic, molding characteristic, mechanical characteristic, heat deformation property, etc. The thermal degradation characteristic of polymethyl methacrylate (PMMA) which is a copolymer of MMA and MA, or MMA and EA (ethyl acrylate), is determined by the magnitude of bond energy of the respective monomers, i.e., MMA, MA and EA. The bond energy of each monomer is as follows:

MA = 20 kcal/mol.
EA = 18 kcal/mol.
MMA = 13 kcal/mol.

MA is difficult to degradate thermally because of its higher bond energy. On the other hand, the glassy-transition temperature of the polymer made only from MA is about 5° C., and 20° C. for a polymer made only of EA. MMA has the highest glassy-transition temperature of MA, EA and MMA, i.e., 105° C.

The glassy-transition temperature of a PMMA copolymer is determined by the following equation:

$$\frac{Tg(MA) \cdot Q(MA) + Tg(MMA) \cdot Q(MMA)}{Q(MA) + Q(MMA)} = Tg(PMMA)$$

Here, Tg(MA) is the glassy-transition temperature of MA, Tg(MMA) is the glassy-transition temperature of MMA, and Q(MA) and Q(MMA) are amounts by weight of MA and MMA, respectively. Thus, if a heat deformation temperature Tg of 97° C. is desired, the relative proportion of MA becomes about 8%.

Furthermore, the heat distortion temperature (HDT) becomes lower than the glassy-transition temperature Tg. A lower molecular weight of the copolymer which has a low degree of polymerization produces a lower HDT, and a higher molecular weight of copolymer produces a higher HDT.

Preferably, 5–12 wt. % of MA and 88–95 wt. % of MMA are polymerized to form PMMA at a temperature of 155° C. to 165° C. and under a pressure of 2.5 to 3.5 atmospheres.

The present invention is further described hereinafter with reference to FIG. 1.

Figure 1:
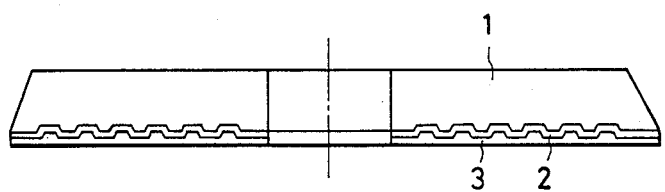
FIG. 1 illustrates a sectional view of an optical disc of the present invention.

FIG. 1 shows a cross-sectional view of an optical disc of an embodiment of the present invention, wherein the reference numeral 1 indicates a replica made by injection molding, formed with information tracks and pits, and transparent plastic. The numeral 2 indicates a thin layer formed on the replica 1. The numeral 3 refers to a protective layer formed on the thin layer 2 for prevention of damage to the thin layer 2.

The thin layer 2 may be an information recorded layer or a layer capable of being recorded. That is, the thin layer 2 may be a reflective layer of the read-only type, a write-once type memory layer or an erasable-type memory layer. Materials of which a read-only type layer may be made include Al, Cu, Ag, Au and alloys of at least one of these elements. A write-once type memory layer may be of the phase-change type or ablative type. Materials of which the phase-change type of write-once type memory layer may be made include various chalcogenide-compounds (e.g., TeO, Sb-Se-Bi, etc.. Materials of which the ablative type of write-once type memory layer may be made include TeC, Pb-Te-Se, organic dyes (e.g., metallophthalocyanine, naphthoquinone, etc.) and organic metal complex dyestuff. An erasable-type memory layer can be of the phase change type or magneto-optic type. Materials of which the phase-change type of erasable-type memory layer may be made include chalcogenide compounds (e.g., TeO, Sb-Se-Bi, etc.). Materials of which the magneto-optic type erasable-type memory layer may be made include Tb-Fe-Co and Nd-Dy-Fe-Co.

EXAMPLE 1

For producing a replica material, 92 wt. % methyl methacrylate and 8 wt. % methyl acrylate are copolymerized to PMMA by continuous bulk polymerization at a temperature of 160° C. and under a pressure of 3 atmospheres. A high fluidity resin, a belt flow index (MFI) of which is 20 g/10 min., is obtained.

Thereafter, the replica is manufactured by using this PMMA under the conditions of a melting temperature of 280° C. and an injection pressure of 400 Kg/cm$^2$. The diameter of the replica is 300 mm. The double refraction (birefringence) of the replica at the point of 50 mm in a radial direction from the center is about 6 degrees at a single pass at a wavelength of 633 nm. Aluminum is puttered on the replica is a reflective layer with a thickness of 1,000Å. As a protective layer, a mixture of paraffin and butyl methacrylate is roll-coated with a thickness of 15 μm. Ethylene vinyl acetate is coated on the protective layer as an adhesive with a thickness of 80 μm. Two replicas are put together at the adhesive-coated sides, and an optical disc is manufactured.

Figure 4:
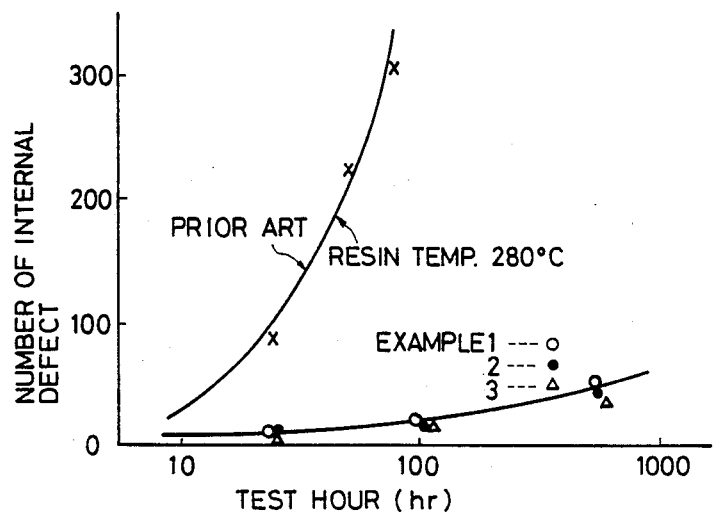
FIG. 4 illustrates a diagram indicating a change with a passage of time of internal defects in accordance with the present invention.

The optical disc was left in an atmosphere of 60° C. and 95% RH, and the result of observation of the internal microscopic bladder defects in the replica is shown in FIG. 4. As can be seen, the number of defects is less than 50 after leaving it for 20 days, and an increase of the defects was not observed.

On the other hand, in a prior PMMA, the number of defects reached over 400 after leaving it for four days.

EXAMPLE 2

The PMMA described in Example 1 obtains a characteristic of high fluidity by a low molecular weight, and has a heat distortion temperature (HDT) of about 86° C.

A PMMA material having a high HDT of 96° C. is prepared by increasing the degree of polymerization of methyl methacrylate and ethyl acrylate having a high molecular weight as a high heat-resistant material. A replica is formed by this PMMA material under the same conditions as in Example 1. That is, 8 wt. % MA and 92 wt. % MMA are copolymerized at a temperature of 160° C. and under a pressure of 3 atmospheres. Since the HDT is improved, the MFI decreases to about 2 g/10 min., and the birefringence at the point of 50 mm in a radial direction from the center increases to about 9 degrees. However, the MFI and the birefringence described above satisfy a specification of the optical disc.

The same test as described in Example 1 was applied to the optical disc obtained from this PMMA material, and no bladder defect in the replica was observed.

EXAMPLE 3

A write-once type memory layer, for example, chalcogenide, is sputtered on the replica manufactured as in Example 1.

Through a process of protective layer formation and assembly, a write-once type optical disc is manufactured. The same test described in Example 1 was applied to the write-once optical disc, and no bladder defect in the replica was observed.

COMPARATIVE EXAMPLE 1

A replica is manufactured by a replica material of a higher degree of polymerization as compared with Example 2 and a high MFI viscosity of 1.8 g/10 min. In case of using such a high viscosity material, a transcribe characteristic of information pits becomes worse than in Example 2 and the birefringence becomes as large as 15 degrees. This replica is not suitable as the base plate of the optical disc of the present invention.

COMPARATIVE EXAMPLE 2

A replica is manufactured by a replica material of a lower degree of polymerization as compared with Example 1 and a low MFI viscosity of 25 g/10 in. In case of using a high fluidity material, the birefringence mall (i.e., less than 4 degrees), but strength becomes low. Splitting the replica at the time of manufacture and/or cracking of the replica surface by leaving in an atmosphere of high temperature and high humidity would occur.

According to the present invention, an optical disc having a long life reliability and a high heat resistance can be obtained by reducing a quantity of MMA monomer contained in the replica.

While we have shown and described various embodiments in accordance with the present invention, it is understood that the same is not limited thereto, but is susceptible of numerous changes and modifications as known to those skilled in the art. Therefore, we do not wish to be limited to the details shown and described herein, but intend to cover all such changes and modifications as are encompassed by the scope of the appended claims.

We claim:

1. An optical information medium for reproducing recorded information optically, comprising a base plate and an information recorded layer supported on said base plate, wherein said base plate is made of polymethylmethacrylate which is a copolymer of methyl methacrylate and methyl acrylate, wherein a quantity of extracted monomer of said copolymer included in said base plate is less than 2 ppm after immersing in water at a temperature of 60° C. for seven days.

2. An optical information medium according to claim 1, wherein a melt flow index of said polymethylmethacrylate is within a range of 2 to 20 g/10 min.

3. An optical information medium according to claim 1, further comprising a protective layer provided over said information recorded layer.

4. An optical information medium according top claim 1, wherein said information recorded layer is a reflective layer.

5. An optical information medium according to claim 4, wherein said reflective layer is made of a material selected from the group consisting of the elements Al, Cu, Ag and Au or an alloy of at least one of aid elements.

6. An optical information medium according to claim 1, wherein said base plate consists essentially of polymethylmethacrylate which is a copolymer of methyl methacrylate and methyl acrylate.

7. An optical information medium according to claim 6, wherein said polymethylmethacrylate is formed by continuous bulk polymerization.

8. An optical information medium according to claim 1, wherein said base plate consists essentially of polymethylmethacrylate which is a copolymer of 88–95 wt. % methyl methacrylate and 5–12 wt. % methyl acrylate.

9. An optical information medium comprising a base plate and an information recordable layer supported on said base plate, wherein said base plate is made of polymethylmethacrylate which is a copolymer of methyl methacrylate and methyl acrylate and wherein a quantity of extracted monomer of said copolymer included in said base plate is less than 2 ppm after immersing in water at a temperature of 60° C. for seven days.

10. An optical information medium according to claim 9, wherein a felt flow index of said polymethylmethacrylate is within a range of 2 to 20 g/10 min.

11. An optical information medium according to claim 9, further comprising a protective layer provided over said information recorded layer.

12. An optical information medium according to claim 9, wherein said base plate consists essentially of polymethylmethacrylate which is a copolymer of methyl methacrylate and methyl acrylate.

13. An optical information medium according to claim 12, wherein said polymethylmethacrylate is formed by continuous bulk polymerization.

14. An optical information medium according to claim 9, wherein said information recordable layer is a write-once type memory layer.

15. An optical information medium according to claim 9, wherein said information recordable layer is an erasable-type memory layer.

16. An optical information medium according to claim 9, wherein said base plate consists essentially of polymethylmethacrylate which is a copolymer of 88–95 wt. % methyl methacrylate and 5–12 wt. % methyl acrylate.

* * * * *